United States Patent
Li et al.

(10) Patent No.: US 9,059,830 B2
(45) Date of Patent: Jun. 16, 2015

(54) DEVICE-TO-DEVICE ON-DEMAND ADVERTISEMENT

(71) Applicant: Intel Corporation, Santa Clara, CA (US)

(72) Inventors: Qinghua Li, San Ramon, CA (US); Honggang Li, Beijing (CN); Jong-Kae Fwu, Sunnyvale, CA (US); Wendy Wong, San Jose, CA (US); Rui Huang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 198 days.

(21) Appl. No.: 13/713,242

(22) Filed: Dec. 13, 2012

(65) Prior Publication Data

US 2014/0036792 A1  Feb. 6, 2014

Related U.S. Application Data

(60) Provisional application No. 61/679,627, filed on Aug. 3, 2012.

(51) Int. Cl.
*H04W 72/04* (2009.01)
*H04J 3/16* (2006.01)
*H04L 5/00* (2006.01)
(Continued)

(52) U.S. Cl.
CPC ............ *H04L 5/0057* (2013.01); *H04W 24/04* (2013.01); *H04W 36/14* (2013.01); *H04W 76/023* (2013.01); *H04W 76/021* (2013.01); *H04W 76/025* (2013.01); *H04W 76/026* (2013.01); *H04L 65/4092* (2013.01); *H04L 65/80* (2013.01); *H04W 16/28* (2013.01); *H04W 24/02* (2013.01); *Y02B 60/50* (2013.01); *H04N 21/23439* (2013.01); *H04N 21/25825* (2013.01); *H04W 40/02* (2013.01); *H04L 41/0836* (2013.01); *H04L 43/0811* (2013.01); *H04L 5/00* (2013.01); *H04L 67/16* (2013.01); *H04L 67/303* (2013.01); *H04W 4/00* (2013.01); *H04W 28/0236* (2013.01); *H04W 40/34* (2013.01); *H04W 72/005* (2013.01); *H04W 72/04* (2013.01); *H04W 72/0406* (2013.01); *H04W 72/0413* (2013.01); *H04W 72/042* (2013.01); *H04W 72/044* (2013.01); *H04W 76/02* (2013.01); *H04W 88/06* (2013.01)

(58) Field of Classification Search
None
See application file for complete search history.

(56) References Cited

U.S. PATENT DOCUMENTS

2003/0177198 A1*  9/2003  Yabe et al. .................... 709/217
2008/0031204 A1    2/2008  Sood
(Continued)

OTHER PUBLICATIONS

International Search Report and Written Opinion mailed Oct. 10, 2013 from International Application No. PCT/US2013/046968.

(Continued)

*Primary Examiner* — Andrew Lee

(57) ABSTRACT

Embodiments of computer-implemented methods, systems, computing devices, and computer-readable media are described herein for device-to-device on-demand advertisement. In some embodiments, the method may include receiving a request for broadcasting an advertisement by a device-to-device (D2D) advertiser via a D2D communication protocol, requesting that an evolved NodeB (eNB) associated with the D2D advertiser allocate a resource for broadcasting the advertisement by the D2D advertiser, determining that the broadcasting the advertisement is no longer needed, and requesting that the eNB retrieve the allocated resource. Other embodiments may be described and claimed.

29 Claims, 7 Drawing Sheets

(51) Int. Cl.
*H04W 24/04* (2009.01)
*H04W 76/02* (2009.01)
*H04L 29/06* (2006.01)
*H04W 24/02* (2009.01)
*H04N 21/2343* (2011.01)
*H04N 21/258* (2011.01)
*H04W 40/02* (2009.01)
*H04L 12/24* (2006.01)
*H04L 12/26* (2006.01)
*H04L 29/08* (2006.01)
*H04W 4/00* (2009.01)
*H04W 28/02* (2009.01)
*H04W 40/34* (2009.01)
*H04W 72/00* (2009.01)
*H04W 88/06* (2009.01)
*H04W 36/14* (2009.01)
*H04W 16/28* (2009.01)

(56) References Cited

U.S. PATENT DOCUMENTS

| | | |
|---|---|---|
| 2008/0071910 A1 | 3/2008 | Thukral |
| 2009/0239514 A1 | 9/2009 | Kenagy et al. |
| 2010/0161417 A1* | 6/2010 | Mitsui et al. ............... 705/14.54 |
| 2011/0035766 A1 | 2/2011 | Reynolds |
| 2012/0093095 A1 | 4/2012 | Barbieri et al. |
| 2013/0195026 A1* | 8/2013 | Johnsson et al. .............. 370/329 |
| 2013/0288668 A1* | 10/2013 | Pragada et al. ............ 455/426.1 |
| 2013/0322216 A1* | 12/2013 | Pompei ......................... 367/152 |
| 2014/0004796 A1* | 1/2014 | Cakulev et al. .............. 455/41.2 |

OTHER PUBLICATIONS

International Preliminary Report on Patentability mailed on Feb. 12, 2015 for International Application No. PCT/US2013/046968, 10 pages.

* cited by examiner

DEVICE-TO-DEVICE ON-DEMAND ADVERTISEMENT

CROSS REFERENCE TO RELATED APPLICATIONS

The present application claims priority to U.S. Provisional Patent Application No. 61/679,627, filed Aug. 3, 2012, entitled "Advanced Wireless Communication Systems and Techniques," the entire disclosure of which is hereby incorporated by reference in its entirety.

FIELD

Embodiments of the present invention relate generally to the technical field of data processing, and more particularly, to device-to-device advertisement communication.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Wireless mobile devices (e.g., user equipment, or "UE" devices) may communicate with each other "indirectly," e.g., via intermediaries such as base stations over a wireless wide area network ("WWAN"). Some mobile devices may be configured to communicate directly with other mobile devices, e.g., via device-to-device ("D2D") communication. D2D communications may be used, e.g., when mobile devices initiate communication with each other while within direct wireless range of each other. D2D communication may be implemented using different platforms, such as 802.11 ("WiFi"), BlueTooth®, near field communication ("NFC"), Long Term Evolution (LTE) communication, FlashLinq by Qualcomm®, and so forth.

In some instances, wireless service providers may be interested in using D2D communications to send advertisements from one mobile device (e.g., a D2D advertiser) to another (e.g., a UE). For example, a base station may allocate a particular resource (e.g., communication channel or bandwidth) to a D2D advertiser, on which the D2D advertiser may broadcast advertisements to other mobile devices (UEs) that may be within D2D communication range. However, if there are no UEs within the D2D communication range that may be interested in receiving ("listening to") advertisements, the D2D advertiser may waste power and allocated resources (e.g., bandwidth). What is more, the D2D advertiser, while broadcasting advertisements that may not be in demand, may unnecessarily interfere with communications between other wireless devices in the same coverage area. The resource and power waste and interference issues may exacerbate as the number of D2D advertisers increases and, consequently, an increased number of advertisements are broadcasted in a particular coverage area.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
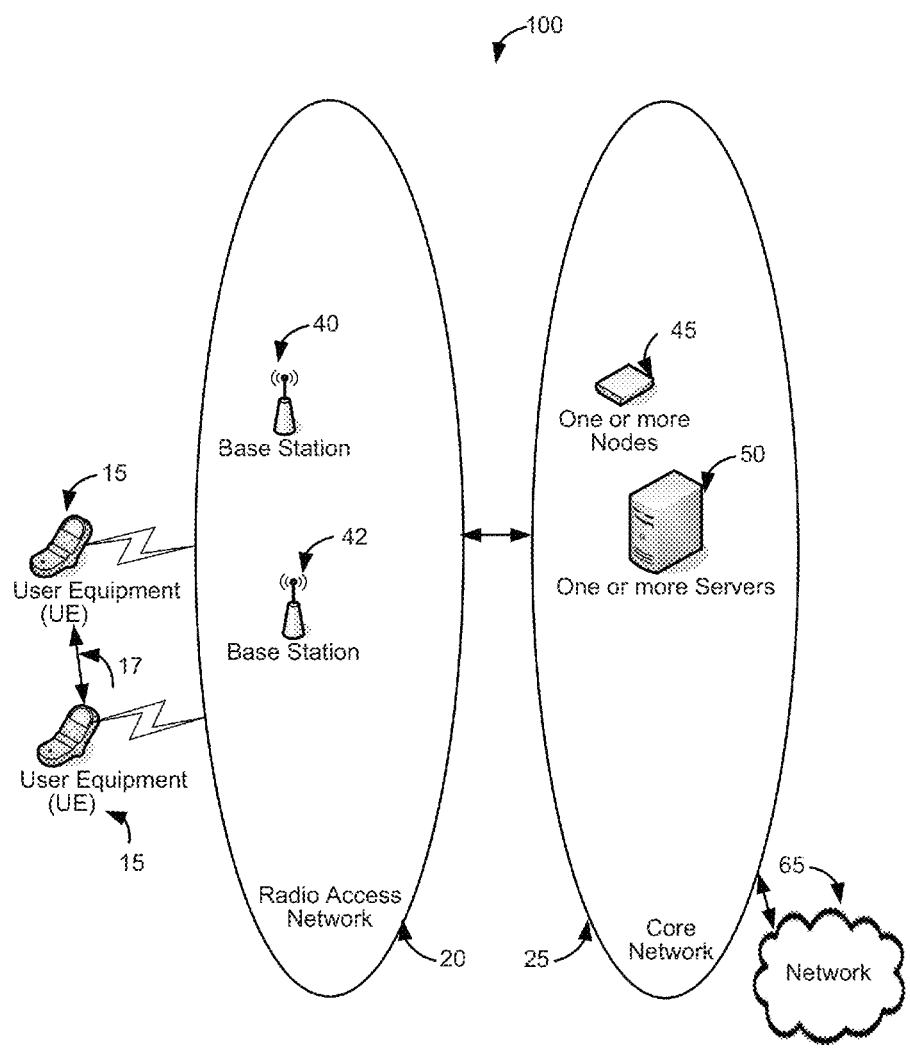
FIG. 1 illustrates an example wireless communication network in accordance with some embodiments.

Embodiments of the present disclosure provide techniques and configurations in a wireless communication network including techniques and configurations for handling on-demand D2D advertisements in a wireless communication network. In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the terms "module" and/or "logic" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality.

Example embodiments may be described herein in relation to wireless communication networks including networks such as 3$^{rd}$ Generation Partnership Project (3GPP) Long-Term Evolution (LTE) networks including any amendments, updates, and/or revisions (e.g., LTE Release 10 (also referred to as LTE-Advanced (LTE-A), LTE Release 11, etc.), Worldwide Interoperability for Microwave Access (WiMAX) networks, and the like. The embodiments described herein may operate in relation to a radio access network, e.g., an evolved Universal Terrestrial Radio Access Network (E-UTRAN) having evolved node base stations (eNBs), and a core network, e.g., an evolved packet core having gateways, management entities, etc.

In other embodiments, communication schemes described herein may be compatible with additional/alternative communication standards, specifications, and/or protocols. For example, embodiments of the present disclosure may be applied to other types of wireless networks where similar advantages may be obtained. Such networks may include, but are not limited to, wireless local area networks (WLANs), wireless personal area networks (WPANs) and/or wireless wide area networks (WWANs) such as cellular networks and the like.

The following embodiments may be used in a variety of applications including transmitters and receivers of a mobile wireless radio system. Radio systems specifically included within the scope of the embodiments include, but are not limited to, network interface cards (NICs), network adaptors, base stations, access points (APs), relay nodes (eNBs), gateways, bridges, hubs and satellite radiotelephones. Further, the radio systems within the scope of embodiments may include satellite systems, personal communication systems (PCS), two-way radio systems, global positioning systems (GPS), two-way pagers, personal computers (PCs) and related peripherals, personal digital assistants (PDAs), personal computing accessories and all existing and future arising systems which may be related in nature and to which the principles of the embodiments could be suitably applied.

Techniques described herein provide for handling on-demand advertisements using D2D communications in a wireless network environment. A system for handling on-demand advertisements may include an eNB configured to monitor such demand and to communicate with a D2D advertisement server configured to provide advertisements, a D2D advertiser configured to broadcast advertisements to UE via D2D channels, and one or more UEs operating in a wireless network environment.

In some embodiments, an eNB may monitor demand for advertisements from UEs. The eNB may monitor UE communications for requests for an advertisement. If eNB receives a request for an advertisement from a UE, the eNB may check with the advertisement server regarding the availability of the requested advertisement, allocate a resource (e.g., communication channel configured for a D2D communication) for the requested advertisement, and provide the resource information to the requesting UE. The D2D advertiser may then broadcast the requested advertisement for the requesting UE via the provided resource. If the eNB ascertains that the advertisement broadcast is no longer needed, the eNB may retrieve the allocated resource and inform the advertisement server and/or the D2D advertiser that the resource is no longer available.

In some embodiments, a D2D advertiser may monitor the demand for advertisements from UEs directly, over a D2D communication channel that may be allocated by the eNB for this purpose. If a D2D advertiser receives a request for an advertisement from a UE, the D2D advertiser may request that the eNB allocate a communication resource (D2D communication channel) and may broadcast the requested advertisement to the requesting UE via the allocated resource. If the D2D advertiser ascertains (e.g., via polling "listening" UEs in the coverage area) that the advertisement broadcast is no longer required, the D2D advertiser may stop broadcasting and request that the eNB retrieve the allocated resource.

FIG. 1 schematically illustrates an example wireless network 100 in which some techniques for providing on-demand D2D advertising described herein may be implemented, in accordance with some embodiments. The following description is provided for an example network that conforms with 3GPP for ease of discussion. However, subject matter of the present disclosure is not limited in this regard and the described embodiments may apply to other networks that benefit from the principles described herein.

The network 100 may include a RAN 20 and a core network 25. In some embodiments, the network 100 may be an LTE network, the RAN 20 may be E-UTRAN, and the core network 25 may be an evolved core network such as EPS (Evolved Packet System). One or more UE 15 may access the core network 25 via a radio link with an eNB such as, for example, one of eNBs 40, 42, etc., in the RAN 20. The UE 15 may be, for example, any wireless device (a subscriber station, a mobile device, a computing device and the like) that is configured to communicate with the eNBs 40, 42 in conformance with one or more protocols. The UE 15 may be further configured to communicate (e.g., via a D2D communication resource 17) with other UEs using D2D communication protocols (e.g., 802.11 ("WiFi"), BlueTooth®, near field communication ("NFC"), FlashLinq, and the like). The eNBs 40, 42 may include one or more antennas, one or more radio modules to modulate and/or demodulate signals transmitted or received on an air interface, and one or more digital modules to process signals transmitted and received on the air interface.

In some embodiments, the UE 15 may be configured to communicate using a multiple-input and multiple-output (MIMO) communication scheme. One or more antennas of the UE 15 may be used to concurrently utilize radio resources of multiple respective component carriers (e.g., which may correspond with antennas of eNBs 40, 42) of RAN 20. The UE 15 may be configured to communicate using Orthogonal Frequency Division Multiple Access (OFDMA) in, e.g., downlink communications, and/or Single-Carrier Frequency Division Multiple Access (SC-FDMA) in, e.g., uplink communications in some embodiments.

While FIG. 1 generally depicts the UE 15 as a mobile wireless device (e.g., a cellular phone), in various embodiments the UE 15 may be a personal computer (PC), a notebook, ultrabook, netbook, smartphone, an ultra mobile PC (UMPC), a handheld mobile device, an universal integrated circuit card (UICC), a personal digital assistant (PDA), a Customer Premise Equipment (CPE), a tablet, or other consumer electronics such as MP3 players, digital cameras, and the like. In some embodiments, the UE 15 may be configured as a D2D advertiser providing on-demand advertisements to other UEs via a D2D communication channel. In the present disclosure, the terms UE, wireless device, and mobile device will be used interchangeably for simplicity purposes.

In some embodiments, communication with the UE 15 via RAN 20 may be facilitated via one or more nodes 45 (e.g., Radio Network Controllers). The one or more nodes 45 may act as an interface between the core network 25 and the RAN 20. According to various embodiments, the one or more nodes 45 may include a Mobile Management Entity (MME) that is configured to manage signaling exchanges between the base stations 40, 42 and the core network 25 (e.g., one or more servers 50), a Packet Data Network Gateway (PGW) to provide a gateway router to a wide network (e.g., Internet) 65, and/or a Serving Gateway (SGW) to manage user data tunnels or paths between the eNBs 40, 42 of the RAN 20 and the PGW. Other types of nodes may be used in other embodiments.

The core network 25 may include logic (e.g., a module) to provide authentication of the UE 15 or other actions associated with establishment of a communication link to provide a connected state of the UE 15 with the network 100. For example, the core network 25 may include one or more servers 50 that may be communicatively coupled to the base stations 40, 42. In an embodiment, the one or more servers 50 may include a Home Subscriber Server (HSS), which may be used to manage user parameters such as a user's International Mobile Subscriber Identity (IMSI), authentication information, and the like. The core network 25 may include other servers, interfaces, and modules. In some embodiments, logic associated with different functionalities of the one or more servers 50 may be combined to reduce a number of servers, including, for example, being combined in a single machine or module.

According to various embodiments, the network 100 may be an Internet Protocol (IP)-based network. For example, the core network 25 may be, at least in part, an IP-based network, such as a packet switched (PS) network. Interfaces between network nodes (e.g., the one or more nodes 45) may be based on IP, including a backhaul connection to the base stations 40, 42. In some embodiments, a UE may communicate with the network according to one or more communication protocols, such as, for example, Radio Resource Control (RRC) protocol adapted for LTE communication environment.

Figure 2:
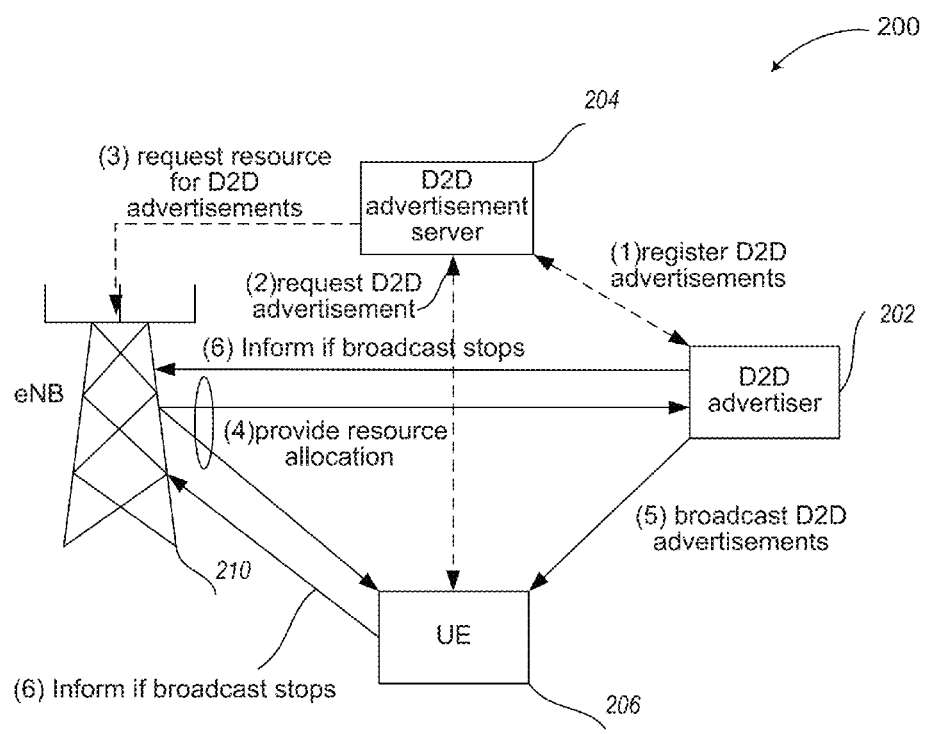
FIG. 2 illustrates an example environment in which some embodiments described herein may be practiced, in accordance with various embodiments.

FIG. 2 illustrates an example system 200 configured to provide on-demand D2D advertisement, in accordance with various embodiments. The system 200 may include a D2D advertiser 202 configured to communicate with a D2D advertisement server 204 and provide advertisements to requesting UEs, e.g., UE 206, via a D2D communication resource (e.g., communication channel). The system 200 may further include an eNB 210 configured to communicate with the D2D advertiser 202 and the D2D advertisement server 204, as well as with the UE 206. The D2D advertisement server 204 may be configured to handle service requests from the UE 206 and the interfaces to related entities including D2D advertiser 202, UE 206 and eNB 210.

The D2D advertiser 202 may be configured to receive information from, or register with, the D2D advertisement server 204. For example, to enable D2D advertisements service, the D2D advertiser 202 may register available or broadcasted D2D advertisements with the D2D advertisement server 204 (as illustrated by numeral (1) in FIG. 2). The D2D advertisement server 204 may keep track of the location of the D2D advertiser 202 (e.g., in terms of home eNB) and the advertisement types so that the D2D advertisement server 204 may respond to inquiries from the UE 206 about advertisements of interest that may be available in a proximity to the UE 206, e.g., in the coverage area of the D2D advertiser 202.

If UE 206 would like to receive a certain type of advertisement, the UE 206 may register a request for an advertisement with the D2D advertisement server 204 directly or via eNB 210 (as illustrated by numeral (2)). The transactions between the D2D advertisement server 204 and requesting UE 206 may be handled through eNB 210. The eNB 210 may allocate the communication resources (as illustrated by numeral (4)), for example, in response to requests from the D2D advertisement server 204 (as illustrated by numeral (3)). The D2D advertiser 202 may be configured to transmit the requested advertisement via the allocated resource ((illustrated by numeral (5)). If no UE is registered for a certain type of advertisement, the eNB 210 may ask the D2D advertiser 204 to stop broadcasting advertisements and may retrieve, e.g., de-allocate, the allocated resource for the advertisement. The D2D advertiser 202 and/or requesting UE 206 may inform the eNB 210 that the broadcast has stopped (illustrated by numeral (6)).

The eNB 210 may have access to a registration list of the UEs that are "listening" to advertisements that may be stored at local or remote depositories. In some embodiments, the eNB 210 may conduct the scheduling for D2D advertisement broadcasting according to various factors, including the D2D advertisement server's requests, quality of service (QoS) priority, the number of UE recipients of advertisements, and the like. For example, if the D2D advertisement server 204 determines there is no recipient ("listener") UE for a certain advertisement, the server may request that the eNB 210 retrieve the allocated resource or not schedule the advertisement.

Figure 3:
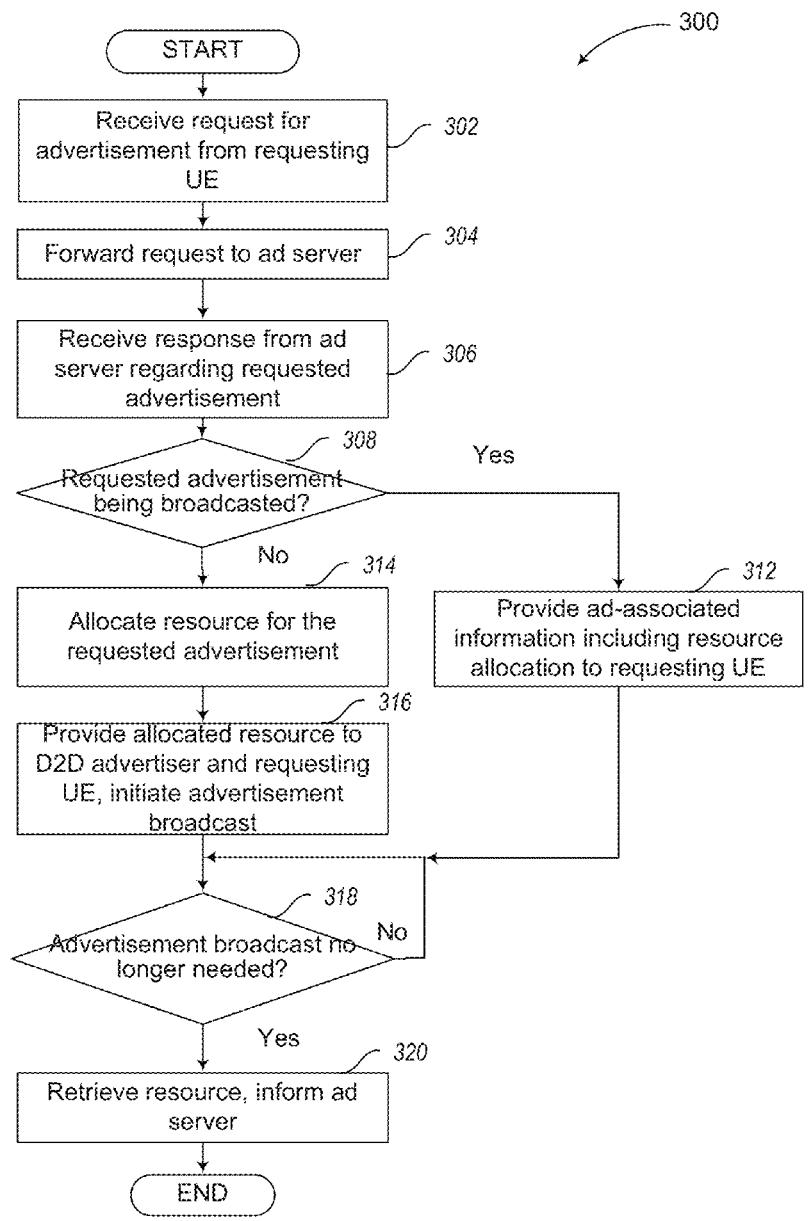
FIG. 3 is a process flow diagram illustrating an example method for providing on-demand advertisement in a D2D environment, in accordance with various embodiments.

FIG. 3 is a process flow diagram illustrating an example process 300 for providing on-demand D2D advertisement, in accordance with various embodiments. The process 300 may be implemented utilizing, for example, system 200 of FIG. 3 described above. The process 300 operations may be performed in various orders other than the order shown, and one or more operations may be added or omitted.

The process 300 may begin at block 302, where the eNB 210 may receive a request for a certain type of advertisement from the UE 206. At block 304, the eNB 210 may forward the request to the D2D advertisement server 204. The D2D advertisement server 204 may check if the requested type of advertisement has been broadcasted by the D2D advertiser 202 in the proximity. At block 306, the eNB 210 may receive from the D2D advertisement server 204 a response to the request provided at block 304. The response may include a result of the determination by the D2D advertisement server 204 whether the requested type of advertisement has been broadcasted. For example, if the D2D advertisement server 204 determines that an advertisement of the requested type is being broadcasted, the D2D advertisement server 204 may provide this information to the eNB 210 and request that the eNB provide advertisement-associated information to the UE 206.

Accordingly, at decision block 308, the eNB 210 may determine, based on the response received at block 306, whether the requested advertisement (or advertisement of requested type) is being broadcasted. If the advertisement is being broadcasted, the eNB 210, at block 312, may provide advertisement associated information to the UE 206. The advertisement-associated information may include, for example, information regarding how to decode the broadcasting advertisement, such as a scrambling/security key to decode the broadcasting advertisement. The advertisement-associated information may further include the allocated resource location. For example, the D2D advertisement server 204 may ask the UE 206 to monitor downlink (DL) control channel for channel allocation for D2D advertisements, and ask the eNB 210 to allocate the channel for specified D2D advertisements. Accordingly, the eNB 210 may provide information associated with the channel for the requested advertisement to the UE 206.

If the eNB 210 determines at decision block 308 that the requested advertisement (or advertisement of the requested type) is not currently broadcasted, the eNB 210, at block 314, may allocate resource for the D2D advertiser 202 to broadcast the requested advertisement (and, in some embodiments, related advertisements such as advertisements of the requested type). Depending on situations such as QoS priority and fairness, the eNB 210 may not allocate the resource timely for the advertisement broadcasting. The eNB 210 may inform the D2D advertisement server 204 of the status of the resource allocation in a timely fashion so that the server 204 may keep track of the status and respond timely to a request for an advertisement.

Once at block 314 the eNB 210 allocates a new resource for the D2D advertiser 202 to broadcast the advertisement, the eNB 210, at block 316, may broadcast the allocation of the resource to both the D2D advertiser 206 and the requesting UE 206. For example, upon receiving the channel request from D2D advertisement server 204 (block 306) and subsequent determination described in reference to block 308, the eNB 210 may send the channel allocation control message to the D2D advertiser 202. The UE 206 may receive this message (either directly from the eNB 210 or via the D2D advertiser 202) and listen to the allocated D2D advertisement channel. After receiving the allocation message, the D2D advertiser 202 may broadcast the advertisement to the UE 206 at the allocated D2D advertisement channel. Accordingly, the eNB 210, at block 316, effectively initiates the advertisement broadcast by the D2D advertiser 202.

Since UEs may move (e.g., out of range of the D2D coverage area) or stop transmitting/receiving due to power shortage, either advertiser or listener may move out of the range or stop transmitting and/or receiving communications via a D2D communication resource (channel). The eNB may retrieve the allocated resource (D2D communication channel) if the advertiser stops broadcasting or if all the listeners move out the range.

If an advertisement listener (e.g., UE 206) moves out of the range or stops listening for some other reason (e.g., loss of interest to the advertisement of the selected type), the UE 206 may inform the eNB 210 about the lack of interest in receiving the broadcasted advertisement. Similarly, if the D2D advertiser 202 stops broadcasting the requested advertisement, the D2D advertiser 202 may also inform the eNB 210. In another example, the D2D advertisement server 204 may realize (e.g., via polling or status updates from the D2D advertiser) that all listening UEs have moved out of the range of the advertisement broadcast. The server 204 then may ask the eNB 210 to stop the advertiser's broadcasting and retrieve the resource. In yet another example, the D2D advertiser 202 may monitor the downlink control channel for a resource to broadcast the requested advertisement. If the D2D advertiser 202 finds no resource for broadcasting the advertisement, the D2D advertiser 202 may stop the broadcasting and inform the eNB 210.

There may be other reasons, besides the examples described above, why the advertisement broadcasting may no longer be needed. The eNB 210 may monitor the incoming communications from the UE 206, D2D advertiser 202, and the D2D advertisement server 204 in order to make a determination that the broadcasting is no longer needed. Accordingly, the eNB 210, at decision block 318, may determine whether the advertisement broadcast is still needed or whether it is no longer required. In the latter case, the eNB, at block 320, may retrieve the allocated resource and inform the server 204 (and/or other system components) about the changes associated with resource allocation.

The D2D advertisement techniques described in reference to FIGS. 2-3 may require active involvement of an eNB and advertisement server. In some embodiments, the eNB may delegate some of its functions described above to other system components. For example, monitoring of the listening UEs may be accomplished by the D2D advertiser directly, thus reducing control overhead. For example, the D2D advertiser may receive inquiries for an advertisement directly from a UE. The D2D advertiser may also monitor the communication channel to determine whether there are any UEs that may be listening to the broadcasted advertisements. Since the advertisement inquiries may be sent over a D2D channel, they may only be received, and responded to, by local D2D advertisers such that only local advertisers may respond. This implicitly provides location information and enhances location based service.

Figure 4:
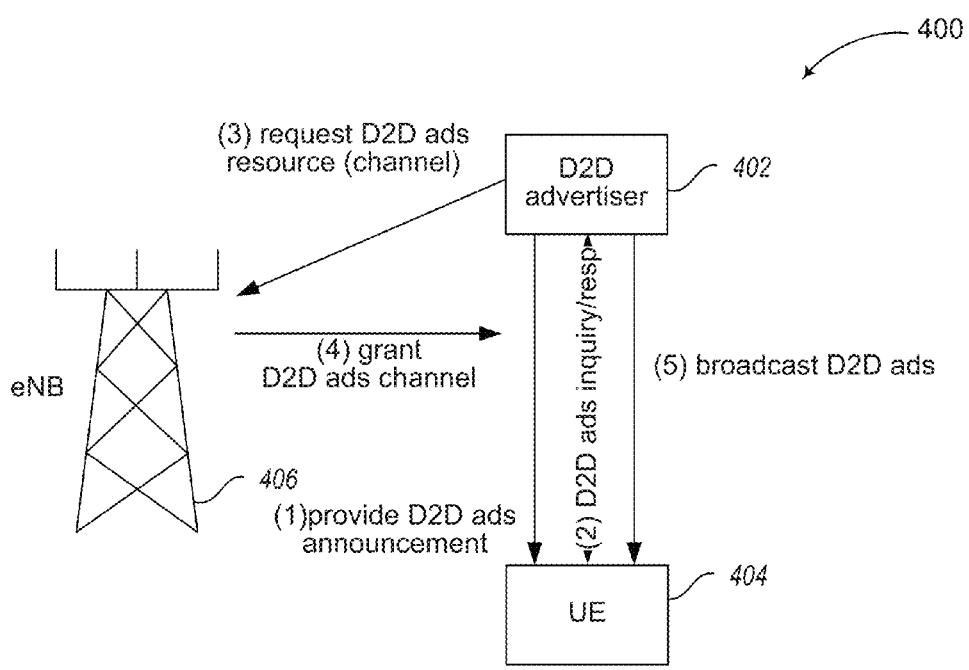
FIG. 4 illustrates another example environment in which some embodiments described herein may be practiced, in accordance with various embodiments.
Figure 5:
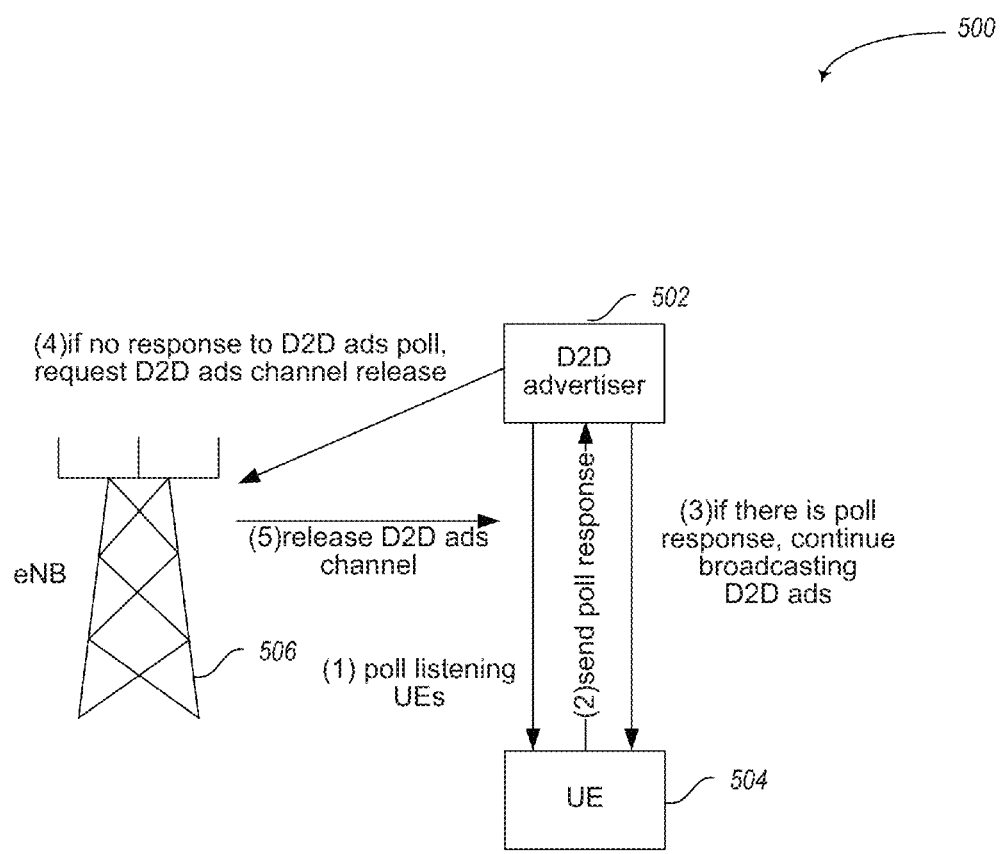
FIG. 5 illustrates still another example environment in which some embodiments described herein may be practiced, in accordance with various embodiments.
Figure 6:
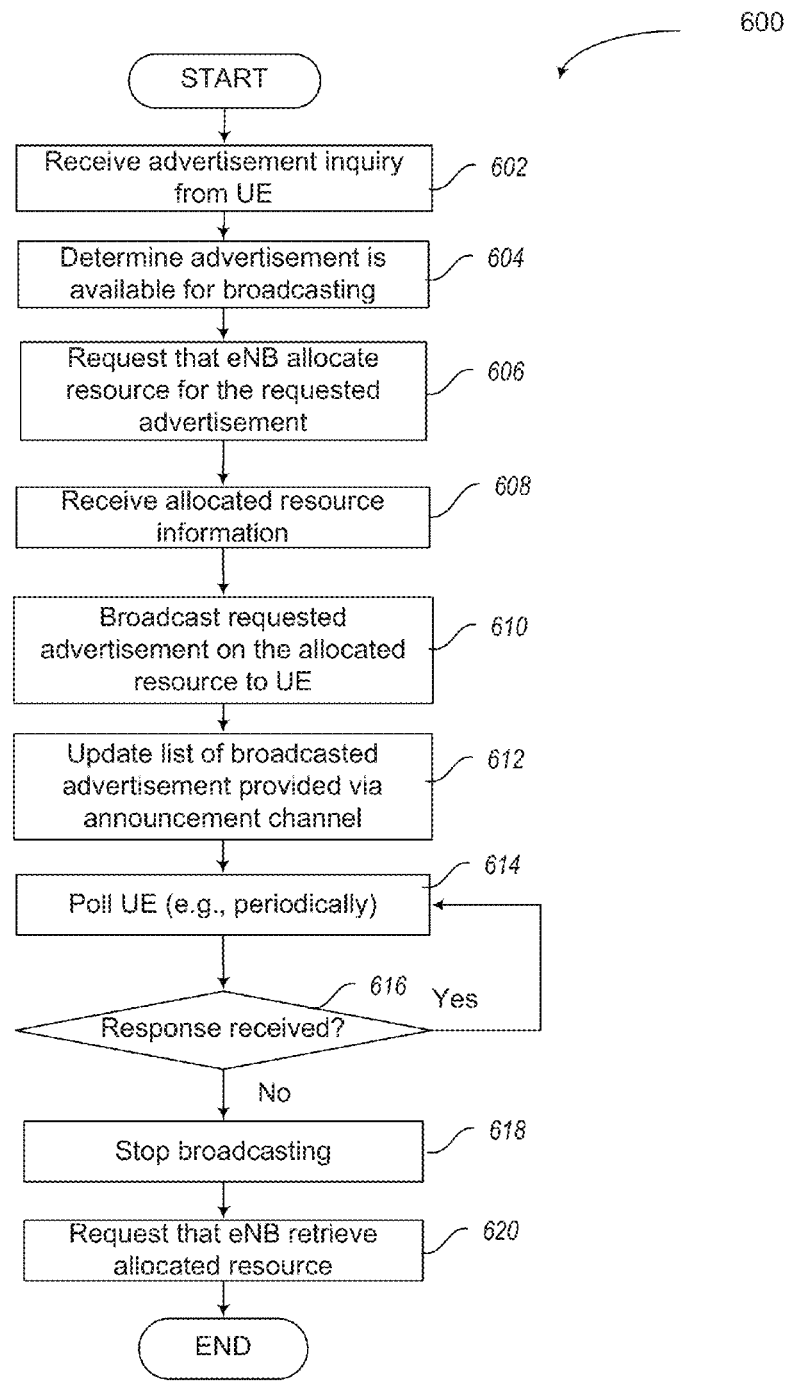
FIG. 6 is a process flow diagram illustrating another example method for providing advertisement in D2D environment, in accordance with various embodiments.

FIGS. 4-6 illustrate examples of D2D environment and techniques for providing on-demand D2D advertisement that may utilize the D2D advertiser for monitoring and control purposes, in accordance with various embodiments. FIGS. 4-5 illustrate an example system 400 (500) configured to provide on-demand D2D advertisement, in accordance with various embodiments, in accordance with various embodiments. The system 400 (500) may include an eNB 406 (506) in communication with a D2D advertiser 402 (502) and a UE 404 (504). With reference to FIG. 4, the D2D advertiser 402 may provide D2D advertisement information via a D2D announcement channel that may be allocated by the eNB 406 (as illustrated by numeral (1)). The UE 404 interested in receiving advertisements may first check the D2D announcement channel for the list of broadcasting advertisements. If the UE 404 finds an interesting advertisement, it may decode the channel location and start to listen to the details of the broadcasting advertisement.

If the existing ads are not interesting to the UE 404, the UE 404 may send an inquiry over a D2D inquiry channel, e.g., using contention-based multiple access scheme (as illustrated by numeral (2)). The D2D inquiry channel may also be allocated by the eNB 406. A D2D advertiser 402 may listen to the D2D inquiry channel. If the inquiry is received by the advertiser and the advertiser wants to send the advertisement, the advertiser may ask the eNB 406 to allocate a resource, e.g., a D2D communication channel for broadcasting the advertisement (numeral (3)). In response, the eNB 406 may grant the D2D advertisement channel to the D2D advertiser (numeral (4)).

The D2D advertiser may start to broadcast the advertisement (numeral (5)) and update the list of broadcasting advertisements on the D2D announcement channel. The inquiring UE may see the advertisement of interest on the list, determine the D2D advertisement channel information associated with the advertisement and may start receiving and decoding the details of the advertisement provided via the D2D advertisement channel allocated for this advertisement. Alternatively, the eNB 406 may grant the D2D advertisement channel and let the D2D advertiser 402 and inquiring UE 404 know about the allocated channel so that the delay with advertisement broadcast may be minimized.

With reference now to FIG. 5, the D2D advertiser may periodically or occasionally ask if there are listeners nearby, e.g., by polling UEs (e.g., UE 504) within the coverage area (illustrated by numeral (1)). The polling may be conducted via a D2D polling channel that may be allocated, e.g., by the eNB 506. If the UE 504 receives such a poll, it may send a known response signal via a specified D2D poll response channel (numeral (2)) such that all the response signals are the same and may be received at the same allocation without interfering with each other. The D2D poll response channel may also be allocated by the eNB 506. The poll may be implicit, such as it may be included in the existing LTE UL bandwidth request, where a known response channel may be reserved for the listeners and no explicit poll signal may need to be sent. If the D2D advertiser 502 receives a response to a poll, the D2D advertiser 502 may broadcast a requested D2D advertisement (numeral (3)).

If no response signal is received over the response channel (e.g., upon expiration of a specified time period implemented by a timer), the D2D advertiser 502 may stop broadcasting the advertisement and request that the eNB 506 retrieve the channel allocated for broadcasting (numeral (4)), upon which request the eNB 506 may release the allocated channel (numeral (5)). In another example, the D2D advertiser 502 may broadcast the advertisement for a predetermined period of time (e.g., based on a timer) and cease the broadcast when the timer expires. Upon the timer expiration, the D2D advertiser 502 may request that the eNB 506 retrieve the allocated channel.

FIG. 6 an example process 600 for providing on-demand D2D advertisement, in accordance with various embodiments. The process 600 may be implemented utilizing, for example, system 400 (500) of FIGS. 4-5 described above. The process 600 operations may be performed in various orders other than the order shown, and one or more operations may be added or omitted.

The process 600 begins at block 60, where a D2D advertiser (e.g., 402 (502)) may receive an inquiry regarding an advertisement (e.g., advertisement of a particular type) from a UE (404 (504)). At block 602, the D2D advertiser 402 (502) may determine whether the requested advertisement is available for broadcasting. For example, the D2D advertiser may access a list of advertisements available for broadcasting via a D2D advertisement server (not shown in FIGS. 4-5) or directly. The list may be stored locally or in a remote data repository and may be accessible by the D2D advertisement server or D2D advertiser. When the D2D advertiser 402 (502) determines that the requested advertisement is available, the D2D advertiser 402 (502), at block 606, may request that the eNB 406 (506) allocate a communication resource for broadcasting the requested advertisement, such as a D2D communication channel.

At block 608, the D2D advertiser 402 (502) may receive information associated with the allocated resource from the eNB 406 (506). At block 610, the D2D advertiser 402 (502) may begin broadcasting the requested advertisement on the allocated resource. At block 612, the D2D advertiser 402 (502) may update the list of advertisements. As described in reference to FIG. 4, the advertisement list may be broadcasted to the listening UEs within the range of the D2D advertiser 402 (502) via an announcement channel that may be allocated for this purpose by the eNB 406 (506).

At block 614, the D2D advertiser 402 (502) may poll the listening UEs (e.g., periodically or occasionally), as described in reference to FIG. 5, in order to determine if there are any listening UEs within the range of coverage. At decision block 616, the D2D advertiser 402 (502) may determine, based on polling, whether there any UEs within the range of coverage. If the D2D advertiser 402 (502) determines that there are one or more listening UEs within the range, the D2D advertiser 402 (502) may continue the polling at block 614. If the D2D advertiser 402 (502) determines that there are no listening UEs within the range, the D2D advertiser 402 (502) may stop broadcasting at block 618 and request, at block 620, that the eNB 406 (506) retrieve the allocated D2D communication channel.

Figure 7:
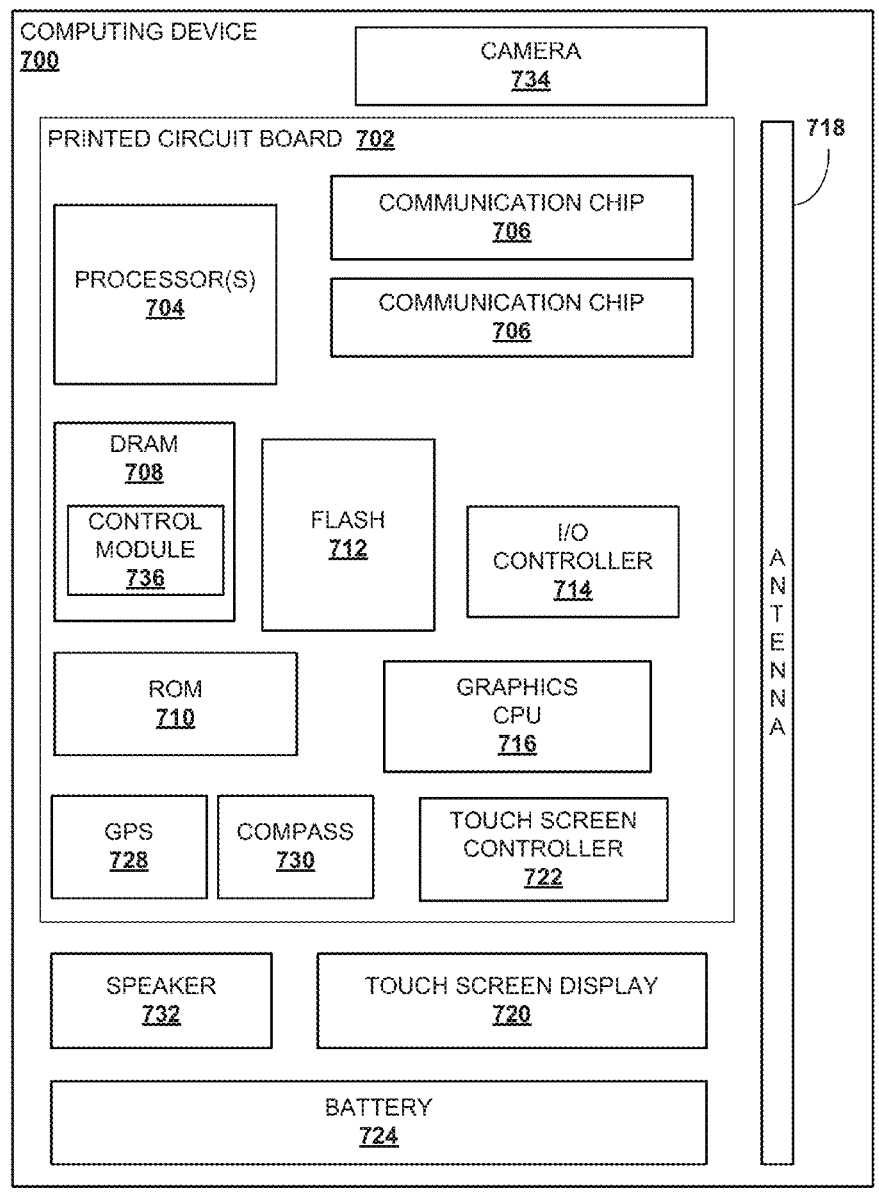
FIG. 7 illustrates an example computing device on which disclosed methods and computer-readable media may be implemented, in accordance with various embodiments.

Embodiments of the present disclosure may be implemented into a system using any suitable hardware and/or software to configure as desired. FIG. 7 illustrates an example computing device 700 that may be used to practice various embodiments described herein. In some embodiments, the computing device 700 may be capable of functioning as the UE 15, 206, 404, or 504 as described herein in references to FIGS. 1, 2, 4, and 5. Further, the system 700 may be configured to perform the processes 300 and 600 described above in reference to FIGS. 3 and 6. In other embodiments, the computing device 700 may be capable of functioning as the one or more nodes 45 or one or more servers 50 of FIG. 1 or D2D advertisement server 204, 402, 502 of FIGS. 2, 4, and 5, or otherwise provide logic/module that performs functions as described for eNB 40, 42, 210, 406, 506, and/or other modules described herein. For example, the computing device may include one or more modules (e.g., communication modules) configured to perform different functions as described for UE 15, 206, 404, or 504 as described herein in references to FIGS. 1, 2, 4, and 5, or nodes 45 or servers 50 as described in reference to FIG. 1, or D2D advertisement server 204, 402, 502, as described in reference to FIGS. 2, 4, and 5, or eNB 40, 42, 210, 406, 506 described in reference to FIGS. 1, 2, 4, and 5.

The computing device 700 may include a number of components, one or more processor(s) 704 and at least one communication chip 706. In various embodiments, the processor 704 may be a processor core. In various embodiments, the at least one communication chip 706 may also be physically and electrically coupled to the processor 704. In further implementations, the communication chip 706 may be part of the processor 704. In various embodiments, computing device 700 may include a printed circuit board (PCB) 702. For these embodiments, processor 704 and communication chip 706 may be disposed thereon. In alternate embodiments, the various components may be coupled without the employment of PCB 702.

Depending on its applications, computing device 700 may include other components that may or may not be physically and electrically coupled to the PCB 702. These other components include, but are not limited to, volatile memory (e.g., dynamic random access memory 708, also referred to as "DRAM"), non-volatile memory (e.g., read only memory 710, also referred to as "ROM"), flash memory 712, an input/output controller 714, a digital signal processor (not shown), a crypto processor (not shown), a graphics processor 716, one or more antenna 718, a display (not shown), a touch screen display 720, a touch screen controller 722, a battery 724, an audio codec (not shown), a video codec (not shown), a global positioning system ("GPS") device 728, a compass 730, an accelerometer (not shown), a gyroscope (not shown), a speaker 732, a camera 734, and a mass storage device (such as hard disk drive, a solid state drive, compact disk ("CD"), digital versatile disk ("DVD"))(not shown), and so forth. In various embodiments, the processor 704 may be integrated on the same die with other components to form a System on Chip ("SoC").

In various embodiments, volatile memory (e.g., DRAM 708), non-volatile memory (e.g., ROM 710), flash memory 712, and the mass storage device may include programming instructions configured to enable computing device 700, in response to execution by processor(s) 704, to practice all or selected aspects of methods 300 or 400. For example, one or more of the memory components such as volatile memory (e.g., DRAM 708), non-volatile memory (e.g., ROM 710), flash memory 712, and the mass storage device may include temporal and/or persistent copies of instructions that, when executed, enable computing device 700 to operate a control module 736 configured to practice all or selected aspects of methods 300 or 400.

The communication chips 706 may enable wired and/or wireless communications for the transfer of data to and from the computing device 700. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. Most of the embodiments described herein may include D2D protocols, like WiFi and others described above. However, the communication chip 706 may implement any of a number of wireless standards or protocols, including but not limited to IEEE 702.20, General Packet Radio Service ("GPRS"), Evolution Data Optimized ("Ev-DO"), Evolved High Speed Packet Access ("HSPA+"), Evolved High Speed Downlink Packet Access ("HSDPA+"), Evolved High Speed Uplink Packet Access ("HSUPA+"), Global System for Mobile Communications ("GSM"), Enhanced Data rates for GSM Evolution ("EDGE"), Code Division Multiple Access ("CDMA"), Time Division Multiple Access ("TDMA"), Digital Enhanced Cordless Telecommunications ("DECT"), Bluetooth, derivatives thereof, as well as any other wireless protocols that are designated as 3G, 4G, 7G, and beyond. The computing device 700 may include a plurality of communication chips 706. For instance, a first communication chip 706 may be dedicated to shorter range wireless communications such as Wi-Fi and Bluetooth and a second communication chip 706 may be dedicated to longer range wireless communications such as GPS, EDGE, GPRS, CDMA, WiMAX, LTE, Ev-DO, and others.

In various implementations, the computing device 700 may be a laptop, a netbook, a notebook, an ultrabook, a smart phone, a computing tablet, a personal digital assistant ("PDA"), an ultra mobile PC, a mobile phone, a desktop computer, a server, a printer, a scanner, a monitor, a set-top box, an entertainment control unit (e.g., a gaming console), a digital camera, a portable music player, or a digital video recorder. In further implementations, the computing device 700 may be any other electronic device that processes data.

According to various embodiments, the present disclosure describes an apparatus that may comprise: one or more computer-readable media comprising instructions; and one or more processors coupled with the one or more computer-readable media and configured to execute the instructions to cause an evolved NodeB (eNB) to: allocate a resource for broadcasting an advertisement by a device-to-device (D2D) advertiser via a D2D communication protocol, the advertisement being registered with an advertiser server; and retrieve the allocated resource based on a communication provided to the eNB that indicates that the allocated resource is no longer needed for the broadcasting of the advertisement. The communication may be provided by the D2D advertiser, a wireless device configured to receive the advertisement, or the advertiser server.

The one or more processors may be further configured to execute the instructions to cause the eNB to forward a request for the advertisement, received from the wireless device, to the advertiser server. The one or more processors may be further configured to execute the instructions to cause the eNB to allocate the resource for broadcasting the advertisement based on a communication from the advertiser server that indicates that the advertisement requested by the wireless device is not being broadcasted. The one or more processors may be further configured to execute the instructions to cause the eNB to provide information associated with the advertisement to the wireless device based on a communication from the advertiser server that indicates that the advertisement requested by the wireless device is being broadcasted. The information associated with the advertisement may include resource location, modulation and coding scheme, and security information for decoding the advertisement.

The one or more processors may be further configured to execute the instructions to cause the eNB to inform the advertiser server or the wireless device of a status of the allocated resource. The communication that indicates that the allocated resource is no longer needed for the broadcasting of the advertisement may further indicate that the wireless device is out of a range defined by the D2D communication protocol, the D2D advertiser has stopped broadcasting the advertisement, or the wireless device provided an indication that the broadcasted advertisement is no longer desired. The D2D communication protocol may include at least one of Wi-Fi, Bluetooth®, near field communication (NFC), Long Term Evolution (LTE) communication, or FlashLinq.

According to various embodiments, the present disclosure describes an apparatus to be hosted by a device-to-device advertiser. The apparatus may comprise: a first communication module configured to receive, from an evolved NodeB (eNB), information associated with a resource allocated for broadcasting an advertisement via a device-to-device (D2D) communication protocol; and a second communication module configured to: broadcast the advertisement on the allocated resource via the D2D communication protocol based on the received information; and request that the eNB retrieve the allocated resource based on determination that the broadcast of the advertisement is no longer needed. The first communication module may be further configured to communicate to the eNB a request to allocate the resource for broadcasting the advertisement.

The second communication module may be further configured to cease the broadcasting of the advertisement based on the determination that the broadcast of the advertisement is no longer needed. The second communication module may be further configured to poll a wireless device that is an intended recipient of the advertisement.

The determination that the broadcast of the advertisement is no longer needed may be further based on a response to the polling of the wireless device or absence of the response. The polling and polling responses may be conducted via a D2D polling channel and a D2D polling response channel respectively. The determination indicating that the broadcasting the advertisement is no longer needed may be further based on expiration of a timer associated with the broadcasting of the advertisement.

The second communication module may be further configured to: receive, from a wireless device via a D2D inquiry channel, an inquiry associated with the advertisement; and in response to the inquiry, communicate a request to the eNB to allocate the resource for broadcasting the advertisement. The D2D inquiry channel may be provided by the eNB and configured to facilitate communications with the wireless device. The second communication module may be further configured to communicate, via a D2D announcement channel, a list of advertisements available for broadcasting, wherein the D2D announcement channel may be provided by the eNB and is accessible by a wireless device. The second communication module may be further configured to update the list of available advertisements that is communicated via the D2D announcement channel. The allocated resource may be a D2D advertisement channel.

According to various embodiments, the present disclosure describes a computing device-readable medium comprising instructions stored thereon wherein the instructions, when executed on a computing device, may cause a user equipment (UE) associated with the computing device to: determine, from a list of broadcasted advertisements provided by a D2D advertiser over a D2D announcement channel, that an advertisement of interest is being broadcasted; identify a D2D channel allocated for the advertisement of interest based on channel information associated with the broadcasted advertisement of interest and provided via the D2D announcement channel; initiate reception of the advertisement of interest via the D2D advertisement channel; and respond, via a D2D polling channel, to polling inquiries provided by the D2D advertiser until the polling inquiries are no longer detectable. The D2D inquiry communication channel, the D2D announcement channel, the D2D advertisement channel, and the D2D polling channel may be provided by an evolved NodeB (eNB) associated with the D2D advertiser.

The instructions, in response to execution on the computing device, may further cause the UE to determine, from the list of broadcasted advertisements provided by the D2D advertiser over the D2D announcement channel, that the advertisement of interest is not broadcasted, and submit to the D2D advertiser, over a D2D inquiry communication channel, a request for the advertisement of interest. The broadcasting may be enabled by a D2D communication protocol, wherein the D2D communication protocol may include at least one of Wi-Fi, Bluetooth®, near field communication (NFC), Long Term Evolution (LTE) communication, or FlashLinq. The UE may be configured to communicate via the D2D communication protocol.

According to various embodiments, the present disclosure describes a computer-implemented method that may comprise receiving, with a device-to-device (D2D) advertisement server, a request for broadcasting an advertisement by a D2D advertiser via a D2D communication protocol; requesting, with the D2D advertisement server, that an evolved NodeB (eNB) associated with the D2D advertiser allocate a resource for broadcasting the advertisement by the D2D advertiser; determining, with the D2D advertisement server, that the broadcasting the advertisement is no longer needed; and requesting, with the D2D advertisement server, that the eNB retrieve the allocated resource. The method may further comprise causing, with the D2D advertisement server, the D2D advertiser to stop the broadcasting. Causing the D2D advertiser to stop the broadcasting may include requesting, with the D2D advertisement server, that the eNB stop the broadcasting by the D2D advertiser. The determining that the broadcasting the advertisement is no longer needed may further include receiving, with the D2D advertisement server, a notification that one or more wireless devices that were intended recipients of the advertisement are no longer within the range of the broadcast. The request for broadcasting the advertisement may be provided by a wireless device configured to receive D2D communications from the D2D advertiser. The method may further include receiving, with the D2D advertisement server, information regarding a status of the resource allocation.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. An apparatus comprising:
   one or more computer-readable media comprising instructions; and
   one or more processors coupled with the one or more computer-readable media and configured to execute the instructions to cause an evolved NodeB (eNB) to:
      allocate a resource for broadcasting an advertisement by a device-to-device (D2D) advertiser via a D2D communication protocol, the advertisement being registered with an advertiser server; and
      retrieve the allocated resource based on a communication provided to the eNB that indicates that the allocated resource is no longer needed for the broadcasting of the advertisement,
   wherein the communication is provided by the D2D advertiser, a wireless device configured to receive the advertisement, or the advertiser server.

2. The apparatus of claim 1, wherein the one or more processors are further configured to execute the instructions to cause the eNB to forward a request for the advertisement, received from the wireless device, to the advertiser server.

3. The apparatus of claim 2, wherein the one or more processors are further configured to execute the instructions to cause the eNB to allocate the resource for broadcasting the advertisement based on a communication from the advertiser server that indicates that the advertisement requested by the wireless device is not being broadcasted.

4. The apparatus of claim 2, wherein the one or more processors are further configured to execute the instructions to cause the eNB to provide information associated with the advertisement to the wireless device based on a communication from the advertiser server that indicates that the advertisement requested by the wireless device is being broadcasted.

5. The apparatus of claim 4, wherein the information associated with the advertisement includes resource location, modulation and coding scheme, and security information for decoding the advertisement.

6. The apparatus of claim 1, wherein the one or more processors are further configured to execute the instructions to cause the eNB to inform the advertiser server or the wireless device of a status of the allocated resource.

7. The apparatus of claim 1 wherein the communication that indicates that the allocated resource is no longer needed for the broadcasting of the advertisement further indicates the wireless device is out of a range defined by the D2D communication protocol, the D2D advertiser has stopped broadcasting the advertisement, or the wireless device provided an indication that the broadcasted advertisement is no longer desired.

8. The apparatus of claim 1, wherein the D2D communication protocol includes at least one of Wi-Fi, Bluetooth®, near field communication (NFC), Long Term Evolution (LTE) communication, or FlashLinq.

9. An apparatus to be hosted by a device-to-device advertiser, the apparatus comprising:
   a first communication module configured to receive, from an evolved NodeB (eNB), information associated with a resource allocated for broadcasting an advertisement via a device-to-device (D2D) communication protocol; and
   a second communication module configured to:
      broadcast the advertisement on the allocated resource via the D2D communication protocol based on the received information; and request that the eNB retrieve the allocated resource based on determination that the broadcast of the advertisement is no longer needed.

10. The apparatus of claim 9, wherein the first communication module is further configured to communicate to the eNB a request to allocate the resource for broadcasting the advertisement.

11. The apparatus of claim 9, wherein the second communication module is further configured to cease the broadcasting of the advertisement based on the determination that the broadcast of the advertisement is no longer needed.

12. The apparatus of claim 9, wherein the second communication module is further configured to poll a wireless device that is an intended recipient of the advertisement.

13. The apparatus of claim 12, wherein the determination that the broadcast of the advertisement is no longer needed is further based on a response to the polling of the wireless device or absence of the response.

14. The apparatus of claim 12, wherein the polling and polling responses are conducted via a D2D polling channel and a D2D polling response channel respectively.

15. The apparatus of claim 9, wherein the determination indicating that the broadcasting the advertisement is no longer needed is further based on expiration of a timer associated with the broadcasting of the advertisement.

16. The apparatus of claim 9, wherein the second communication module is further configured to:
receive, from a wireless device via a D2D inquiry channel, an inquiry associated with the advertisement; and
in response to the inquiry, communicate a request to the eNB to allocate the resource for broadcasting the advertisement,
wherein the D2D inquiry channel is provided by the eNB and configured to facilitate communications with the wireless device.

17. The apparatus of claim 9, wherein the second communication module is further configured to communicate, via a D2D announcement channel, a list of advertisements available for broadcasting, wherein the D2D announcement channel is provided by the eNB and is accessible by a wireless device.

18. The apparatus of claim 17, wherein the second communication module is further configured to update the list of available advertisements that is communicated via the D2D announcement channel.

19. The apparatus of claim 9, wherein the allocated resource is a D2D advertisement channel.

20. At least one non-transitory computing device-readable medium comprising instructions stored thereon wherein the instructions, when executed on a computing device, cause a user equipment (UE) associated with the computing device to:
determine, from a list of broadcasted advertisements provided by a D2D advertiser over a D2D announcement channel, that an advertisement of interest is being broadcasted;
identify a D2D channel allocated for the advertisement of interest based on channel information associated with the broadcasted advertisement of interest and provided via the D2D announcement channel;
initiate reception of the advertisement of interest via the D2D advertisement channel; and
respond, via a D2D polling channel, to polling inquiries provided by the D2D advertiser until the polling inquiries are no longer detectable,
wherein the D2D inquiry communication channel, the D2D announcement channel, the D2D advertisement channel, and the D2D polling channel are provided by an evolved NodeB (eNB) associated with the D2D advertiser.

21. The at least one non-transitory computing device-readable medium of claim 20, wherein the instructions, in response to execution on the computing device, further cause the UE to:
determine, from the list of broadcasted advertisements provided by the D2D advertiser over the D2D announcement channel, that the advertisement of interest is not broadcasted; and
submit to the D2D advertiser, over a D2D inquiry communication channel, a request for the advertisement of interest.

22. The at least one non-transitory computing device-readable medium of claim 20, wherein the broadcasting is enabled by a D2D communication protocol, wherein the D2D communication protocol includes at least one of Wi-Fi, Bluetooth®, near field communication (NFC), Long Term Evolution (LTE) communication, or FlashLinq.

23. The at least one non-transitory computing device-readable medium of claim 22, wherein the UE is configured to communicate via the D2D communication protocol.

24. A computer-implemented method, comprising:
receiving, with a device-to-device (D2D) advertisement server, a request for broadcasting an advertisement by a D2D advertiser via a D2D communication protocol;
requesting, with the D2D advertisement server, that an evolved NodeB (eNB) associated with the D2D advertiser allocate a resource for broadcasting the advertisement by the D2D advertiser;
determining, with the D2D advertisement server, that the broadcasting the advertisement is no longer needed; and
requesting, with the D2D advertisement server, that the eNB retrieve the allocated resource.

25. The computer-implemented method of claim 24, further comprising: causing, with the D2D advertisement server, the D2D advertiser to stop the broadcasting.

26. The computer-implemented method of claim 25, wherein causing the D2D advertiser to stop the broadcasting includes requesting, with the D2D advertisement server, that the eNB stop the broadcasting by the D2D advertiser.

27. The computer-implemented method of claim 24, wherein the determining that the broadcasting the advertisement is no longer needed further includes receiving, with the D2D advertisement server, a notification that one or more wireless devices that were intended recipients of the advertisement are no longer within the range of the broadcast.

28. The computer-implemented method of claim 24, wherein the request for broadcasting the advertisement is provided by a wireless device configured to receive D2D communications from the D2D advertiser.

29. The computer-implemented method of claim 24, further comprising: receiving, with the D2D advertisement server, information regarding a status of the resource allocation.

* * * * *